(12) United States Patent
Yukishima et al.

(10) Patent No.: US 9,340,103 B2
(45) Date of Patent: May 17, 2016

(54) IN-WHEEL MOTOR DRIVE DEVICE

(75) Inventors: Ryou Yukishima, Iwata (JP); Minoru Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 254 days.

(21) Appl. No.: 13/980,722

(22) PCT Filed: Jan. 11, 2012

(86) PCT No.: PCT/JP2012/050300
§ 371 (c)(1),
(2), (4) Date: Jul. 19, 2013

(87) PCT Pub. No.: WO2012/098958
PCT Pub. Date: Jul. 26, 2012

(65) Prior Publication Data
US 2013/0292994 A1 Nov. 7, 2013

(30) Foreign Application Priority Data

Jan. 21, 2011 (JP) ................................ 2011-010453

(51) Int. Cl.
*B60K 7/00* (2006.01)
*B60K 17/04* (2006.01)
*B60K 17/14* (2006.01)

(52) U.S. Cl.
CPC ............. *B60K 7/0007* (2013.01); *B60K 17/043* (2013.01); *B60K 17/145* (2013.01); *B60K 2007/0038* (2013.01); *B60K 2007/0092* (2013.01)

(58) Field of Classification Search
CPC .......... B60K 7/00; B60K 7/0007; B60K 7/14;
B60K 7/145; B60K 17/043; B60K 17/145;
B60K 2007/0038; B60T 1/06; B60T 1/065;
B60T 1/067
See application file for complete search history.

(56) References Cited

U.S. PATENT DOCUMENTS

| 5,087,229 | A  | * | 2/1992  | Hewko et al. ................. 475/149 |
| 5,163,528 | A  | * | 11/1992 | Kawamoto et al. ......... 180/65.51 |
| 5,180,180 | A  | * | 1/1993  | Yamashita et al. ............. 180/253 |
| 5,382,854 | A  | * | 1/1995  | Kawamoto et al. .......... 310/67 R |
| 6,942,049 | B2 | * | 9/2005  | Shimizu ....................... 180/65.6 |
| 7,214,155 | B2 | * | 5/2007  | Mueller et al. ..................... 475/5 |
| 7,556,580 | B2 | * | 7/2009  | Saito et al. ..................... 475/154 |

(Continued)

FOREIGN PATENT DOCUMENTS

| CN | 1424970  | 6/2003 |
| CN | 101360626 | 2/2009 |

(Continued)

OTHER PUBLICATIONS

International Preliminary Report on Patentability and Written Opinion of the International Searching Authority issued Aug. 1, 2013 in International (PCT) Application No. PCT/JP2012/050300.

(Continued)

*Primary Examiner* — Katy M Ebner
(74) *Attorney, Agent, or Firm* — Wenderoth, Lind & Ponack, L.L.P.

(57) ABSTRACT

An in-wheel motor driving device includes a wheel braking device. A back plate of a drum brake or a mounting member for calipers of a disc brake constituting the wheel braking device is formed integrally with an outboard-side end member which is fastened to a outboard-side end surface of a housing of a speed reducer section.

15 Claims, 10 Drawing Sheets

(56) References Cited

U.S. PATENT DOCUMENTS

| | | | |
|---|---|---|---|
| 7,717,203 B2 * | 5/2010 | Yoshino et al. | 180/65.51 |
| 7,735,588 B2 * | 6/2010 | Murata | 180/65.51 |
| 7,735,589 B2 * | 6/2010 | Sugiyama | 180/65.51 |
| 8,157,036 B2 * | 4/2012 | Yogo et al. | 180/65.51 |
| 2004/0080223 A1 | 4/2004 | Shimizu | |
| 2005/0061565 A1 | 3/2005 | Mizutani et al. | |
| 2006/0144626 A1 | 7/2006 | Mizutani et al. | |
| 2007/0078035 A1 * | 4/2007 | Oshidari | 475/149 |
| 2007/0247001 A1 * | 10/2007 | Nakano | 303/157 |
| 2008/0053719 A1 | 3/2008 | Yoshino et al. | |
| 2008/0308330 A1 | 12/2008 | Murata | |
| 2011/0062769 A1 | 3/2011 | Haeusler | |
| 2011/0175431 A1 | 7/2011 | Yoshino et al. | |
| 2011/0316322 A1 * | 12/2011 | Abiko et al. | 301/6.5 |

FOREIGN PATENT DOCUMENTS

| | | |
|---|---|---|
| DE | 42 14 716 | 11/1992 |
| EP | 1 362 736 | 11/2003 |
| EP | 1 961 602 | 8/2008 |
| FR | 2 726 230 | 5/1996 |
| JP | 2002-247713 | 8/2002 |
| JP | 2007-174725 | 7/2007 |
| JP | 2008-37355 | 2/2008 |
| JP | 2008-48493 | 2/2008 |
| JP | 2008-57552 | 3/2008 |
| JP | 2008-141864 | 6/2008 |
| JP | 2008-202746 | 9/2008 |
| JP | 2010-184557 | 8/2010 |
| WO | 2007/141841 | 12/2007 |
| WO | 2009/138080 | 11/2009 |

OTHER PUBLICATIONS

International Search Report issued Mar. 19, 2012 in International (PCT) Application No. PCT/JP2012/050300.

Supplementary European Search Report issued Jun. 3, 2014 in corresponding European Application No. 12736443.8.

Office Action issued Jun. 17, 2014 in corresponding Japanese Application No. 2011-010453, with English translation.

Chinese Office Action issued Mar. 27, 2015 in corresponding Chinese Patent Application No. 201280005905.7, with partial English translation.

* cited by examiner

IN-WHEEL MOTOR DRIVE DEVICE

BACKGROUND OF INVENTION

1. Technical Field

The present invention relates to an in-wheel motor driving device connecting an electric motor's output shaft with a hub of a vehicle wheel coaxially via a speed reducer.

2. Background Art

A conventional in-wheel motor driving device 101 is disclosed in JP-A-2002-247713 (Patent Literature 1) for example.

The in-wheel motor driving device 101 in FIG. 10 includes a motor section 103 which rotatably drives an output shaft 106; a speed reducer section 105 which reduces rotation of the output shaft 106 and transmits the rotation to a wheel-side output shaft 108; a wheel hub bearing section 104 which has a wheel hub 109 connected to the wheel-side output shaft 108; and a drum brake 102 serving as braking equipment.

As shown in FIG. 10 and FIG. 11, the drum brake 102 includes a back plate 110, which is fastened to a housing 107 of the speed reducer section 105 with bolts 111.

Also, in the example shown in FIG. 10 and FIG. 11, the wheel hub bearing section 104 has a fixing ring 112 (fixing member), which is fastened to the housing 107 of the speed reducer section 105 by using bolts 113.

In the example shown in FIG. 10 and FIG. 11, the back plate 110 and the fixing ring 112 are fastened individually to the housing 107 of the speed reducer section 105 by using the bolts 110, 113 respectively as described above. However, the back plate 110 and the fixing ring 112 may be fastened together to the housing 107 of the speed reducer section 105 with the bolts 113 as shown in FIG. 12.

CITATION LIST

Patent Literature

Patent Literature 1: JP-A-2002-247713

Technical Problem

In the in-wheel motor driving device 101, the housing 114 of the motor section 103 and the housing 107 of the speed reducer section 105 are usually made of aluminum alloy for the sake of weight reduction.

A problem, however, is that as long as the housing 107 of the speed reducer section 105 and the back plate 110 of the drum brake 102 are fastened together by bolts, bolt holes for bolting the two members must be made longer than in cases where the housing is made of steel, in order to ensure that sufficient strength will be provided by the aluminum alloy.

In the example disclosed in Patent Literature 1, bolting areas are formed relatively longer, and given a greater thickness than other walls.

If it is impossible to give an increased wall thickness only in the bolt fastening areas, the in-wheel motor unit has to be given an increased axial length, which results in a problem of overall increase in the weight.

Any bolt holes which communicate with internal space are undesirable since they can be potential route for oil leakage. Thus, if all bolt holes are designed so as not to communicate with internal space, then the wall thickness may have to be further increased.

SUMMARY OF THE INVENTION

Therefore, it is an object of the present invention to provide an in-wheel motor driving device which retains good assemblability, has a deceased axial dimension, includes aluminum alloy housings having a minimum wall thickness for reduced weight.

Solution to Problem

In order to achieve the object stated above, the present invention provides an in-wheel motor driving device which includes a motor section; a wheel hub bearing section; a speed reducer section; and a wheel braking device. The motor section's output shaft is coaxially connected with the wheel hub bearing section via the speed reducer section. The wheel braking device is provided by a drum brake which includes a brake drum fastened to a hub ring in the wheel hub bearing section; and a back plate which is disposed on a fixing-ring side of the wheel hub bearing section, and the back plate of the drum brake is formed integrally with an outboard-side end member fastened to an outboard-side end surface of a housing of the speed reducer section.

In cases where the wheel braking device is provided by a disc brake which includes a brake disc fastened to a hub ring in the wheel hub bearing section; and calipers disposed on a fixing-ring side of the wheel hub bearing section, the invention provides the following arrangement: The calipers have their mounting member formed integrally with an outboard-side end member fastened to an outboard-side end surface of a housing of the speed reducer section.

The outboard-side end member is bolted to the housing of the speed reducer section.

The outboard-side end member is made of an iron or steel material whereas the housing of the speed reducer section is made of a light-metal material.

The fixing ring of the wheel hub bearing section and the outboard-side end member may be formed integrally with each other.

The outboard-side end member may have a knuckle integrally therewith, with the knuckle being connected only with a lower arm extending from a car body.

The outboard-side end member may have a knuckle integrally therewith, with the knuckle being connected with an upper arm and a lower arm extending from a car body.

Also, the outboard-side end member may have a knuckle integrally therewith, with the knuckle having its upper side connected with a buffering device.

It is desirable that a sealing member is disposed between the outboard-side end member and the housing of the speed reducer section for prevention of oil leakage from inside.

The sealing member is provided by an O ring.

Advantageous Effects of Invention

The present invention provides, as has been described, an in-wheel motor driving device which includes a wheel braking device having its components, i.e. a back plate of a drum brake or a mounting member for calipers of a disc brake, formed integrally with an outboard-side end member which is a member fastened to an outboard-side end surface of a housing of the speed reducer section. The invention enables to decrease the number of parts and to minimize the axial dimension.

Also, the wheel hub bearing section's fixing ring is formed integrally with the outboard-side end member, whereby it becomes possible to decrease the number of fastening bolts and to minimize the thickness of the aluminum-alloy housing, leading to weight reduction.

Further, the outboard-side end member has a knuckle formed integrally therewith. This enables further decrease in the number of parts, contributing to weight reduction.

Still further, the outboard-side end member is disposed on an outboard-side end surface of the speed reducer section. This ensures conventional procedures of assembling the motor section and the speed reducer section from the axial direction, so the invention does not affect assemblability.

DESCRIPTION OF EMBODIMENTS

Hereinafter, embodiments of the present invention will be described based on the attached drawings.

Figure 8:
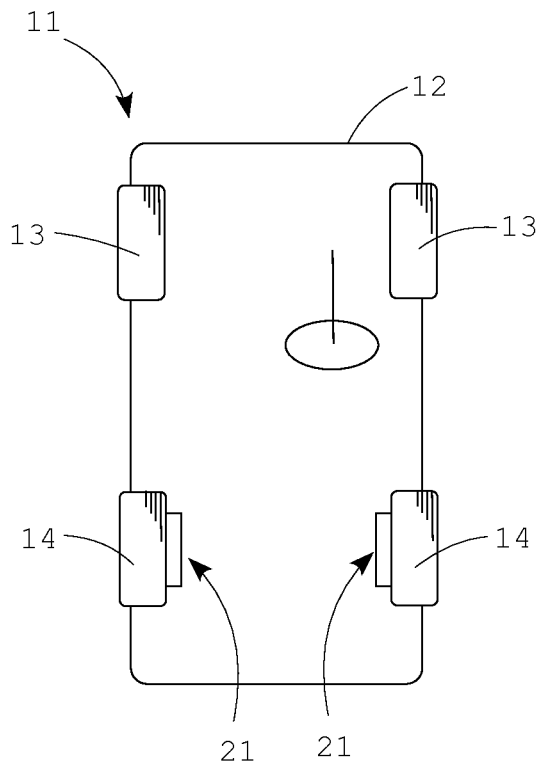
FIG. 8 is a schematic plan view of an electric vehicle which includes in-wheel motor driving devices.

As shown in FIG. 8, an electric vehicle 11 equipped with in-wheel motor driving devices according to an embodiment of the present invention includes a chassis 12, front wheels 13 as steering wheels, rear wheels 14 as driving wheels, and in-wheel motor driving devices 21 which transmit driving forces to the left and the right rear wheels 14 respectively.

Figure 1:
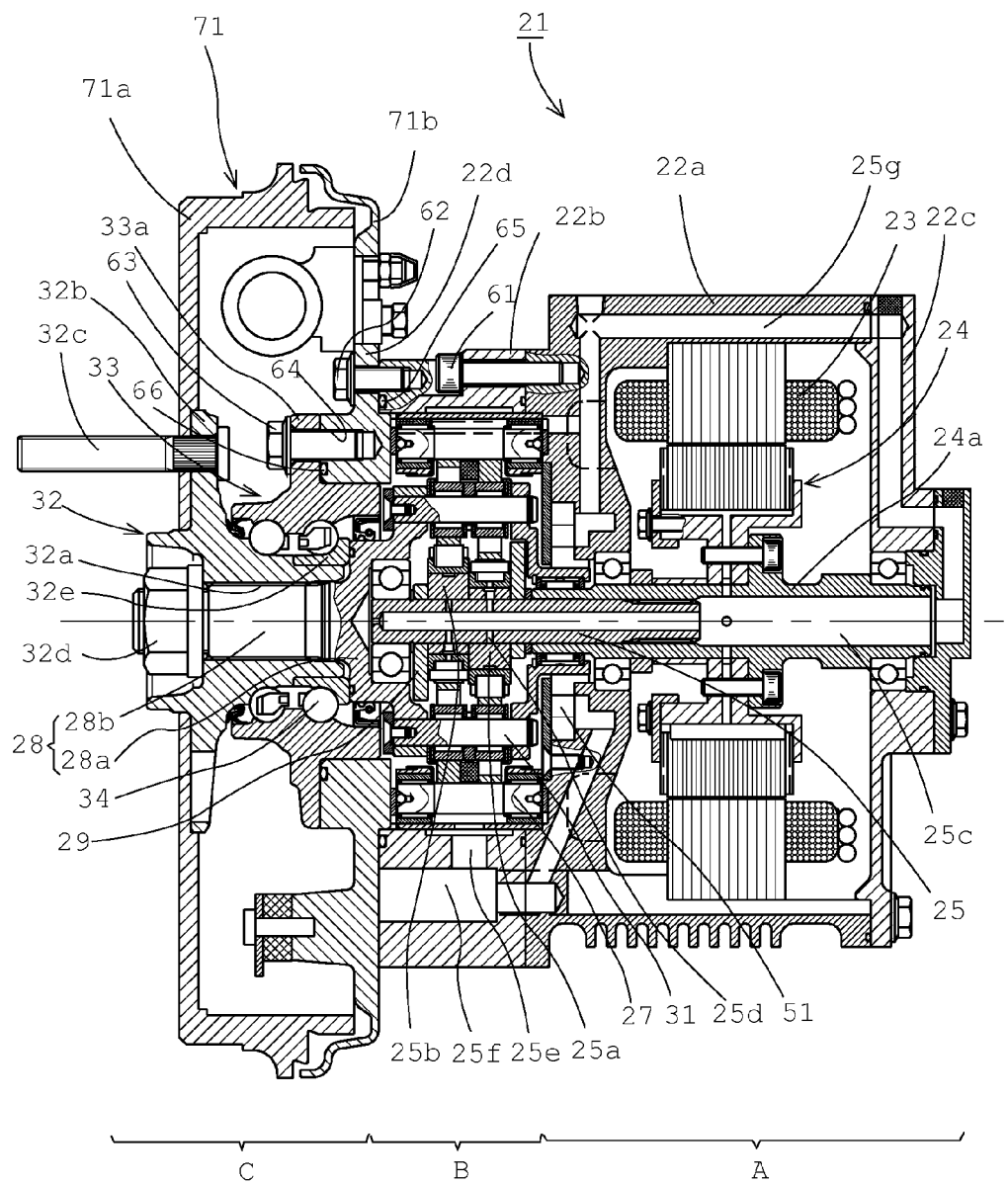
FIG. 1 is a schematic sectional view of an in-wheel motor driving device according to an embodiment of the present invention.
Figure 2:
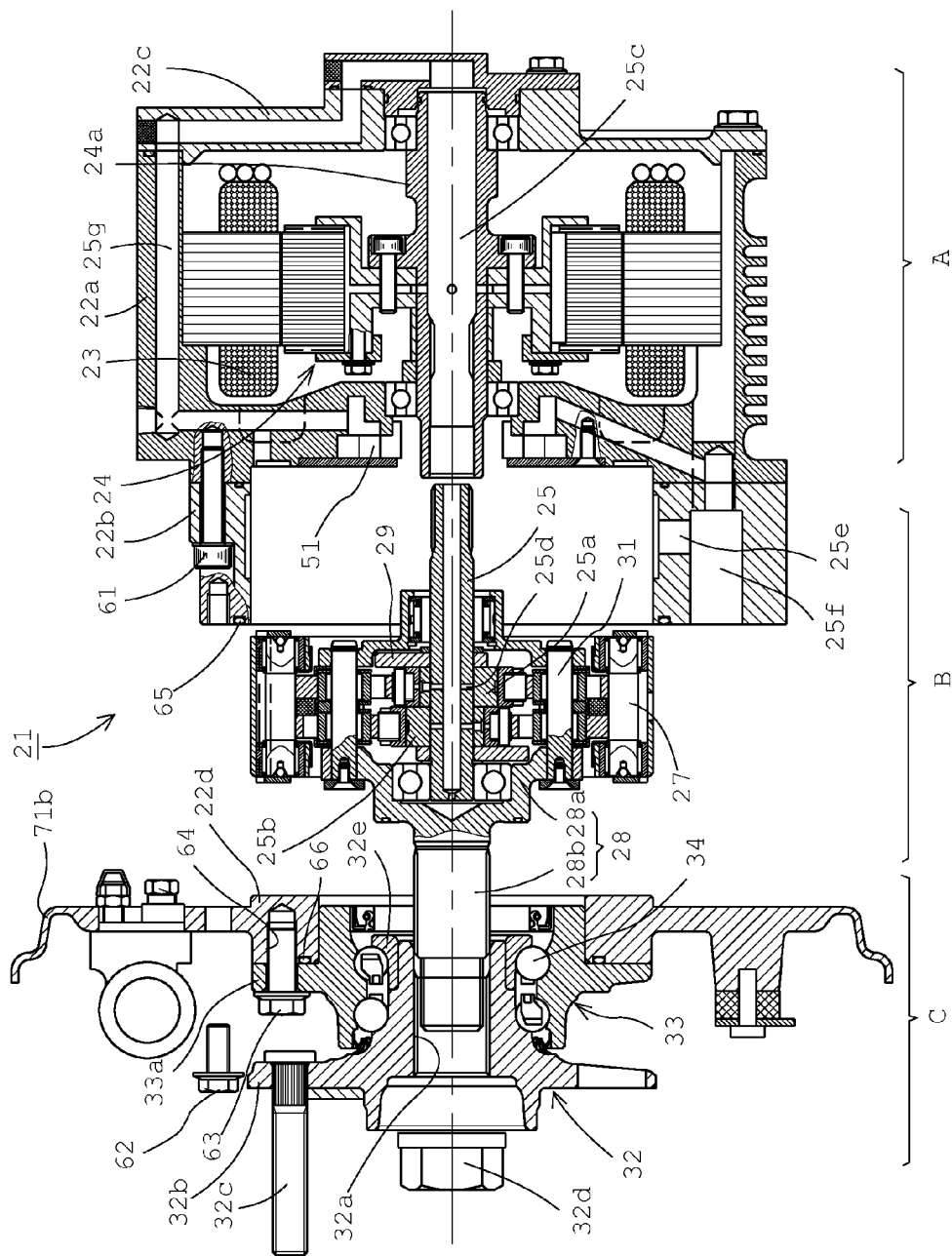
FIG. 2 is an exploded view of the in-wheel motor driving devices in FIG. 1, showing a state before assembly.

As shown in FIG. 1 and FIG. 2, the in-wheel motor driving device 21 includes a motor section A which generates a driving force; a speed reducer section B which reduces rotating speed of the motor section A and outputs the rotating force; and a wheel hub bearing section C which transmits the output from the speed reducer section B to a driving wheel 14.

The motor section A has a housing 22*a* whereas the speed reducer section B has a housing 22*b*, and these two housings are fastened to each other with bolts 61. The housing 22*a* of the motor section A and the housing 22*b* of the speed reducer section B are made of light metal such as an aluminum alloy.

The housing 22*a* of the motor section A has an inboard-side end surface, which is closed by an inboard-side end member 22*c*.

The housing 22*b* of the speed reducer section B has an outboard-side end-surface, to which an outboard-side end member 22*d* is fastened by using bolts 62. A fixing ring 33 of the wheel hub bearing section C is fastened to the outboard-side end member 22*d* by using bolts 63.

The speed reducer section B is assemblable to the motor section A from the outboard side as shown in FIG. 2, once the outboard-side end member 22*d* is removed from the housing 22*b* of the speed reducer section B. Specifically, an input shaft 25 of the speed reducer section B is inserted into an output shaft 24*a* of the motor section A from the outboard side, to assemble the speed reducer section B and the motor section A with each other.

The outboard-side end member 22*d* is made of an iron material or a steel material. In the embodiment shown in FIG. 1 and FIG. 2, the outboard-side end member 22*d* has an outer circumference where there is integrally formed a back plate 71*b* as a part of a drum brake 71 which serves as a braking system component for the wheel. The outboard-side end member 22*d* is formed with bolt holes 64 for the bolts 63 to fasten the fixing ring 33 of the wheel hub bearing section C.

The outboard-side end member 22*d* and the housing 22*b* of the speed reducer section B are fitted to each other with an O-ring disposed therebetween to serve as a sealing member 65 for preventing oil leakage from inside.

The wheel hub bearing section C includes a hub ring 32 for receiving an output shaft 28 of the speed reducer section B; and the fixing ring 33 which is connected and fixed to the outboard-side end member 22*d* of the speed reducer section B using the fastening bolts 63 via a double-row rolling bearing.

The hub ring 32 has a cylindrical hollow section 32*a* and a flange section 32*b*. The flange section 32*b* is fixed and connected with a wheel 14, using bolts 32*c*. Also, the output shaft 28 of the speed reducer section B has its outer diameter surface formed with a spline and a male thread. The hollow section 32*a* of the hub ring 32 has its inner diameter surface formed with a spline hole. With the above-described arrangement, the output shaft 28 of the speed reducer section B is inserted into the inner diameter surface of the hub ring 32, and a nut 32*d* is threaded to the shaft tip to connect the two members with each other.

The hollow section 32*a* of the hub ring 32 has its outer surface formed integrally with a wheel mounting flange 32*b*. The hollow section 32*a* has an outer diameter surface on the vehicle's outer-side, where a double-row roller bearing's outer-side inner track surface is formed integrally therewith. The hollow section 32*a* has an outer diameter surface on the vehicle's inner-side, around which there is fitted an inner ring 32*e* having an inner track surface on its outer surface.

The fixing ring 33 has: an inner circumferential surface, which is formed with an outer-side outer track surface and an inner-side outer track surface corresponding to the outer-side inner track surface and an inboard-side inner track surface respectively of the hub ring 32; and an outer circumferential surface formed with an anchoring flange 33*a*.

The hub ring 32 and the fixing ring 33 are opposed to each other with their respective outboard-side track surfaces and inboard-side track surfaces, and two rows of balls 34 are placed between these two surfaces.

The wheel hub bearing section C which is shown in FIG. 1 and FIG. 2 is a so-called third-generation wheel hub unit, characterized by, as has been described thus far: that the hub ring 32 has an outer circumferential surface formed integrally with a wheel mounting flange 32*b* and one of two inner track surfaces of a double-row rolling bearing; that the fixing ring 33 has an inner circumferential surface formed integrally with outer track surfaces of the double-row rolling bearing; and that the fixing ring 33 has an outer circumferential surface formed integrally with an anchoring flange 33a.

The wheel mounting flange 32b is a place where a brake drum 71a of the drum brake 71 is mounted.

Figure 3:
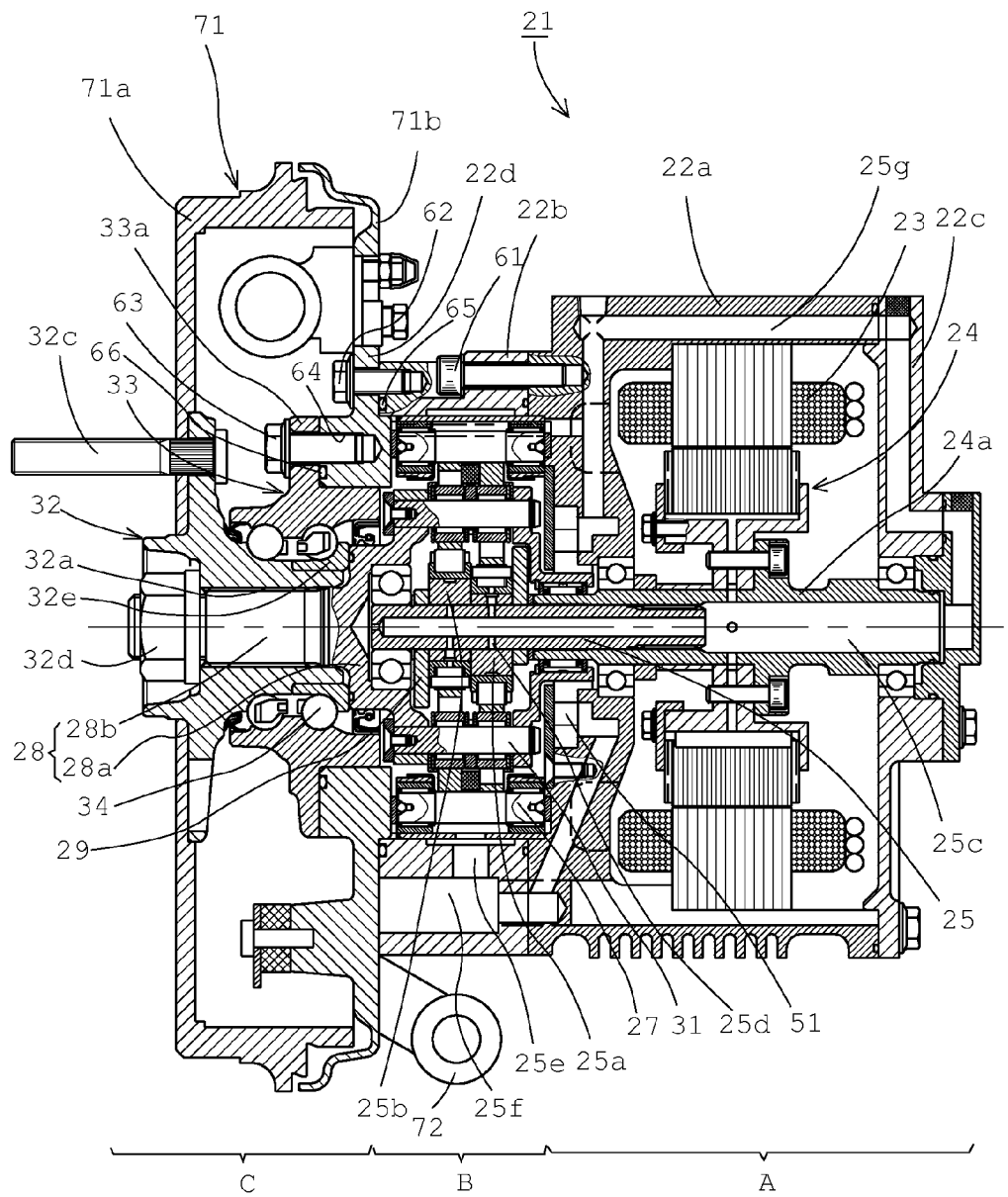
FIG. 3 is a schematic sectional view of an in-wheel motor driving device according to another embodiment of the present invention.

Next, FIG. 3 shows another embodiment, where the back plate 71b of the drum brake 71 is formed integrally on the outboard-side end member 22d, which is also formed integrally with a knuckle 72 for mounting to the car body.

The knuckle 72 used in the embodiment in FIG. 3 is a trailing arm type in which connection is made only with a lower arm.

Figure 4:
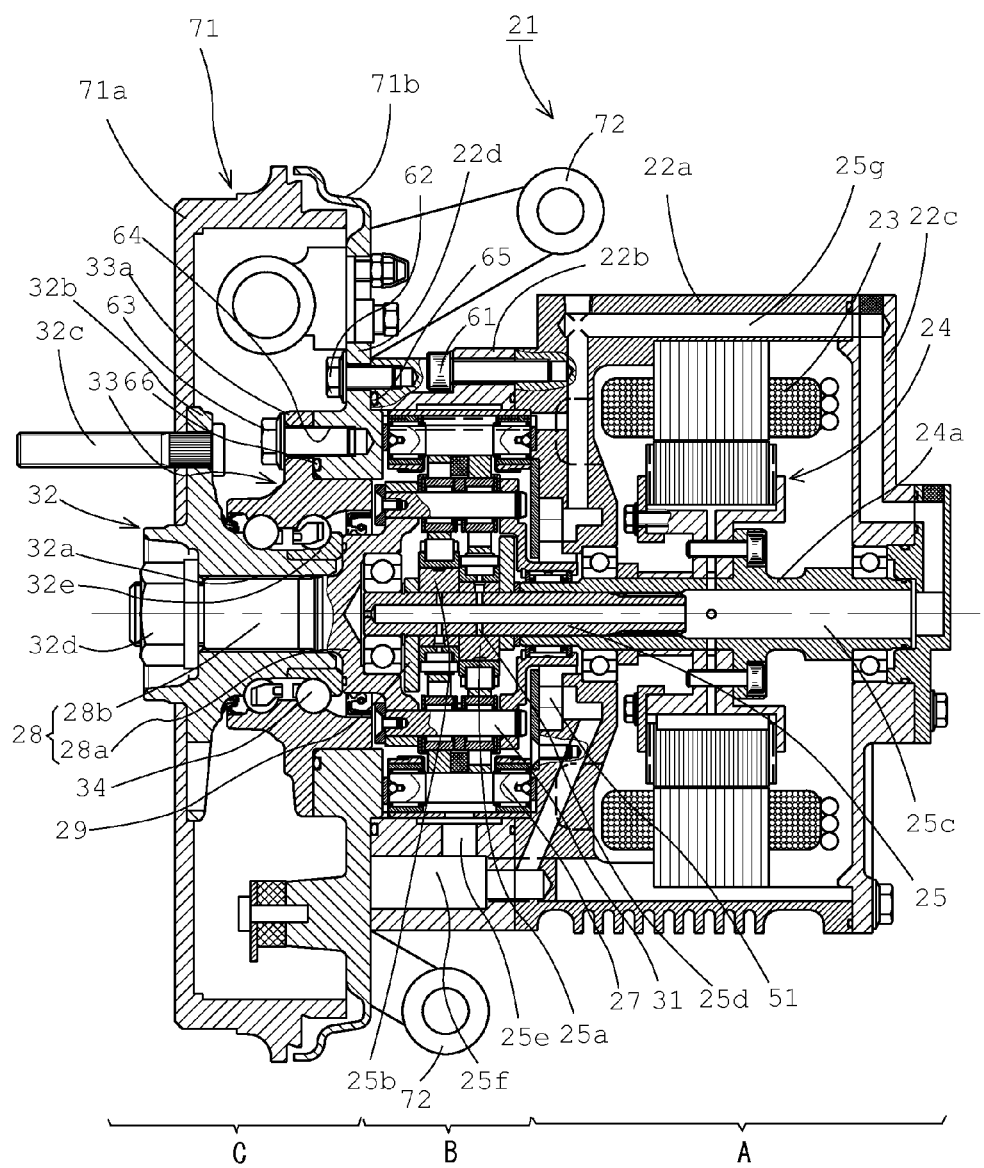
FIG. 4 is a schematic sectional view of an in-wheel motor driving device according to another embodiment of the present invention.

On the other hand, FIG. 4 shows an embodiment which uses a knuckle 72 of a double wishbone type in which connections are made to an upper arm and a lower arm extending from the car body.

Figure 5:
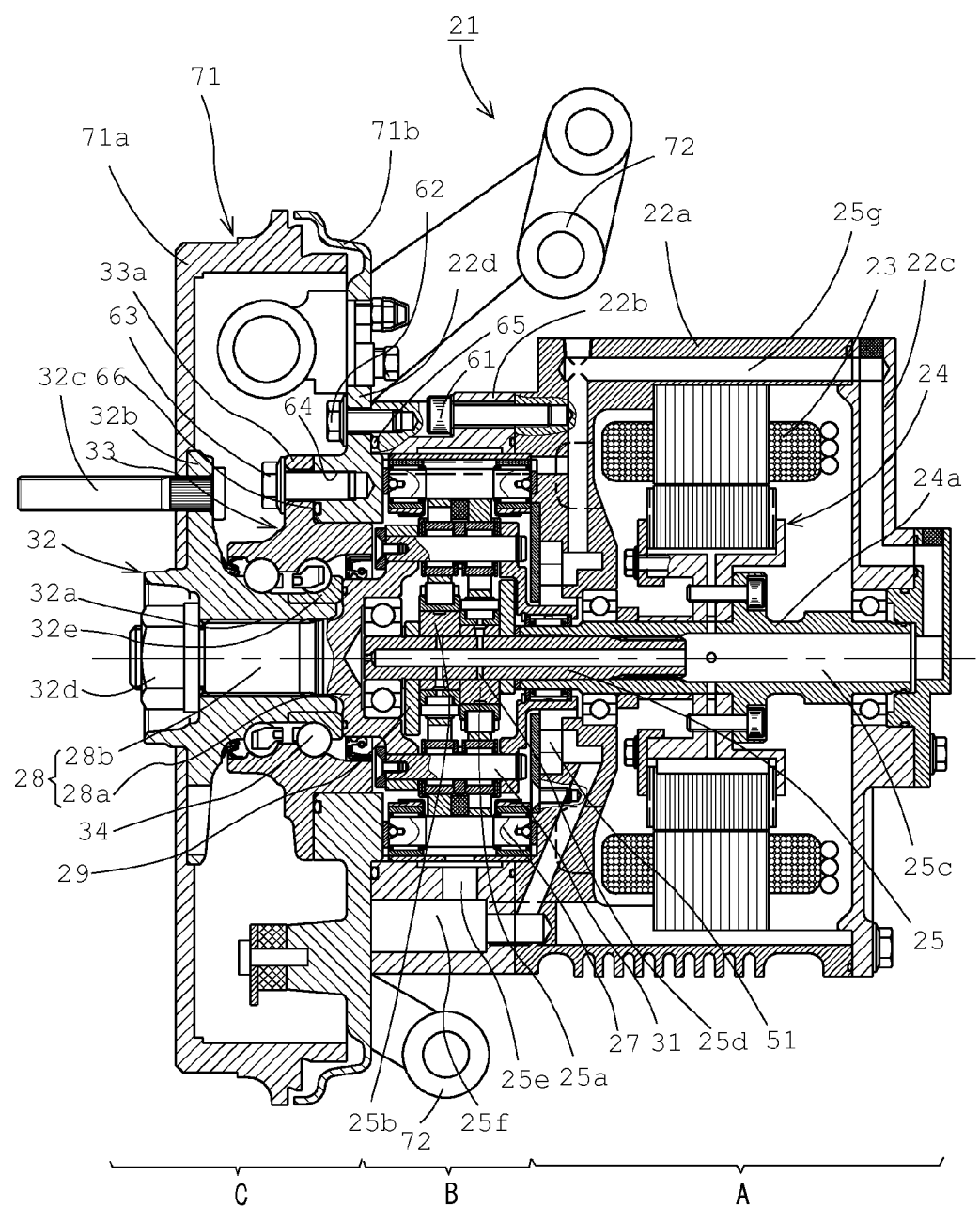
FIG. 5 is a schematic sectional view of an in-wheel motor driving device according to another embodiment of the present invention.

Further, FIG. 5 shows an embodiment which uses a knuckle 72 of a strut type in which a shock absorber is connected above.

Figure 6:
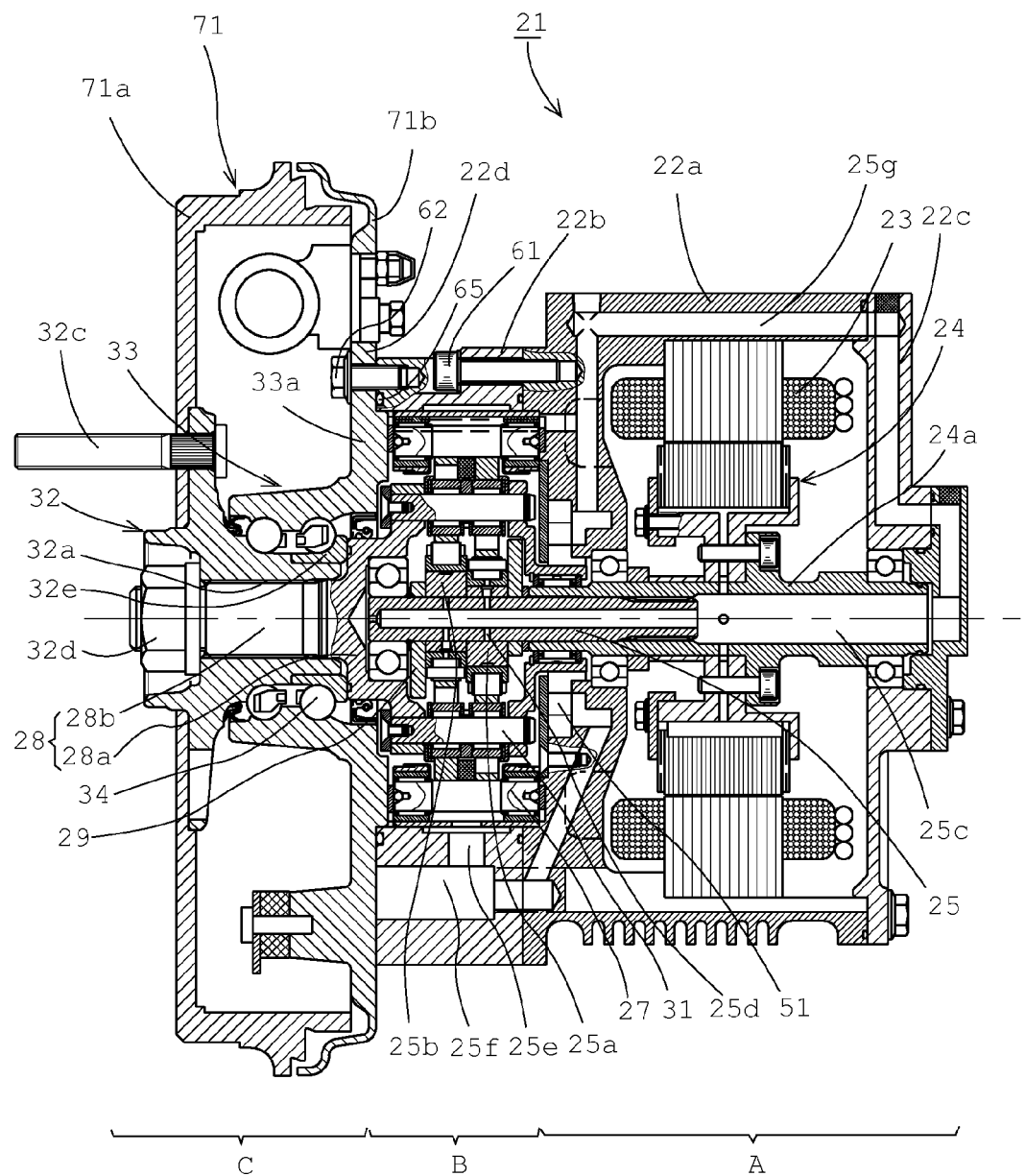
FIG. 6 is a schematic sectional view of an in-wheel motor driving device according to another embodiment of the present invention.

Next, FIG. 6 shows still another embodiment where the anchoring flange 33a of the fixing ring 33 is used as an outboard-side end member 22d. In other words, this embodiment is an example in which the anchoring flange 33a of the fixing ring 33 and the outboard-side end member 22d which constitutes the back plate 71b are integrated with each other. Such an arrangement enables to decrease the number of parts while contributing to weight reduction as well.

Figure 7:
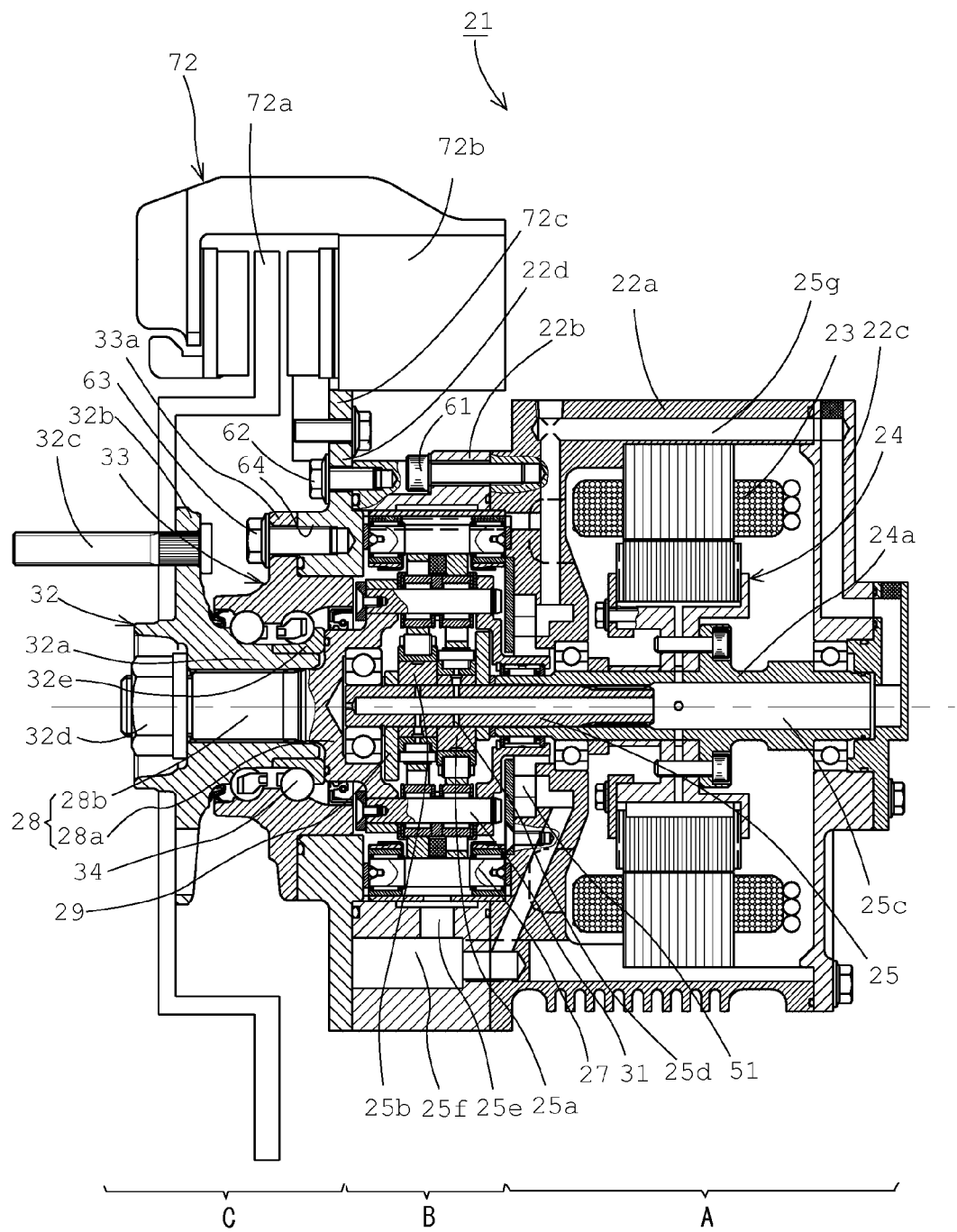
FIG. 7 is a schematic sectional view of an in-wheel motor driving device according to another embodiment of the present invention.

Next, FIG. 7 shows still another embodiment in which the wheel braking equipment is provided by a disc brake 72. The disc brake 72 has its brake disc 72a mounted on the wheel mounting flange 32b whereas brake calipers 72 for squeezing the brake disc 72a are mounted on a mounting member 72c which is integrated with the outboard-side end member 22d.

In each of these embodiments described thus far, the motor section A constitutes a radial-gap motor which includes a stator 23; a rotor 24 disposed inside the stator 23 and opposed thereto with a radial gap in between; and a hollow output shaft 24a fixedly connected inside the rotor 24 for integral rotation with the rotor 24.

The hollow output shaft 24a is disposed through the motor section A to the speed reducer section B for transmission of driving force from the motor section A to the input shaft 25 of the speed reducer section B.

The input shaft 25 of the speed reducer section B has eccentric sections 25a, 25b within the speed reducer section B. The input shaft 25 is fitted into and fastened with the hollow output shaft 24a of the rotor 24 for integral rotation with the rotor 24. The two eccentric sections 25a, 25b are disposed at a 180-degree phase difference so that their centrifugal forces due to their eccentric movement are cancelled each other.

The speed reducer section B includes cycloid discs 26a, 26b which serve as revolving members and are rotatably held by the eccentric sections 25a, 25b; a plurality of outer pins 27 which serve as outer circumferential engager for engagement with outer circumferential portions of the cycloid discs 26a, 26b; and a motion conversion mechanism which transmits rotational movement of the cycloid discs 26a, 26b to the output shaft 28; and counterweights 29 disposed adjacently to the eccentric sections 25a, 25b. The speed reducer section B includes a speed reducer section lubrication mechanism which supplies lubrication oil to the speed reducer section B.

The output shaft 28 includes a flange section 28a and a shaft section 28b. The flange section 28a has its end surface formed with holes at an equidistant interval on a circle centered around a rotational center of the output shaft 28, for fixing inner pins 31. The shaft section 28b is fitted into and fixed to the hub ring 32, and transmits the output from the speed reducer section B to the wheel 14.

Figure 9:
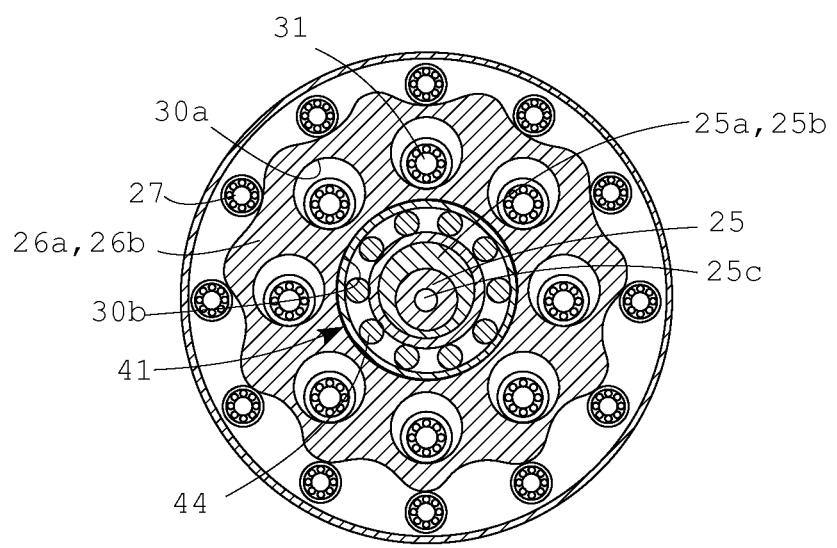
FIG. 9 is a vertical sectional view of a speed reducer section of an in-wheel motor driving device according to the present invention.
Figure 10:
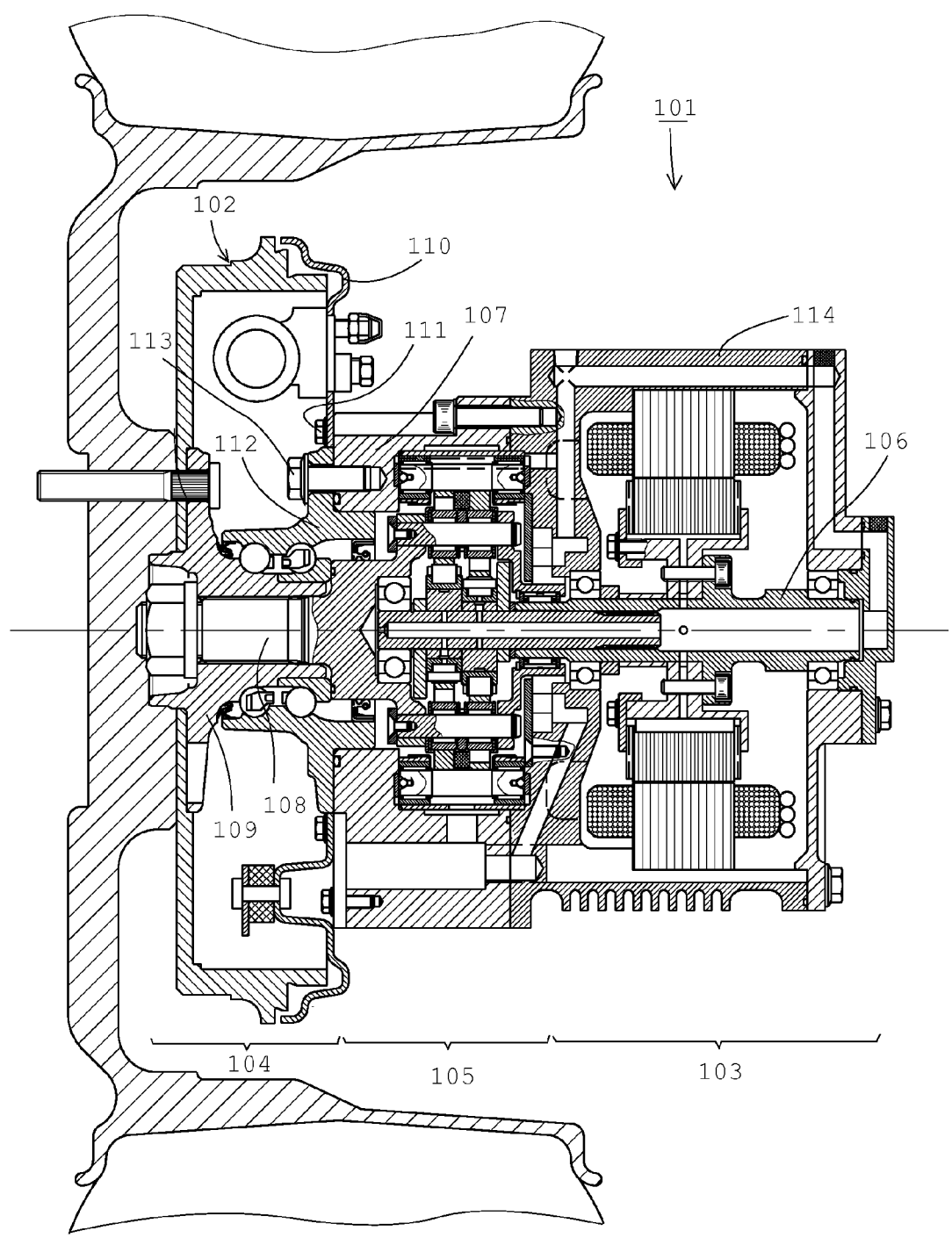
FIG. 10 is a schematic sectional view of a conventional in-wheel motor driving device.
Figure 11:
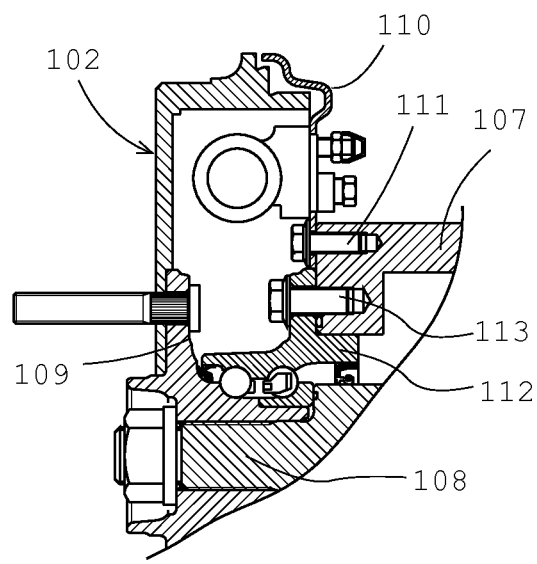
FIG. 11 is an enlarged partial view, showing a conventional example of fastening a back plate of the in-wheel motor driving device.
Figure 12:
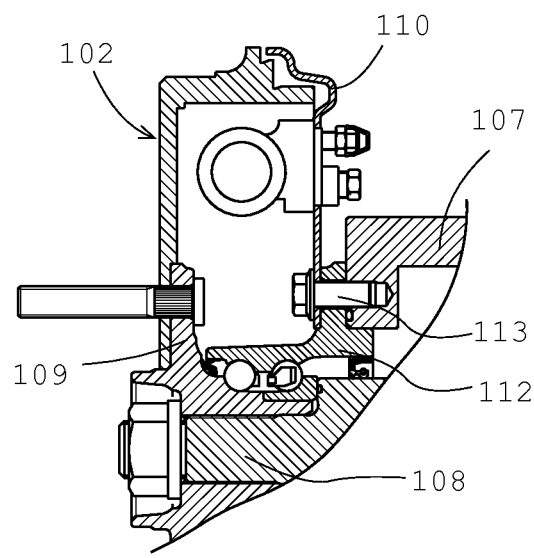
FIG. 12 is an enlarged partial view, showing another conventional example of fastening a back plate of the in-wheel motor driving device.

As shown in FIG. 9, the cycloid discs 26a, 26b have a plurality of waveforms composed of trochoid curves such as epitrochoid curve, on their outer circumferences, and a plurality of through-holes 30a penetrating from one end surface to the other end surface. The through-holes 30a are made equidistantly on a circle centering on the rotational center of the cycloid discs 26a, 26b, and accommodate inner pins 31 which will be described later. Also, a through-hole 30b penetrates the center of the cycloid discs 26a, 26b, and fits around the eccentric sections 25a, 25b.

The cycloid discs 26a, 26b are supported by rolling bearings 41 rotatably with respect to the eccentric sections 25a, 25b. Each of the rolling bearings 41 is provided by a cylindrical roller bearing which includes an inner ring member fitted around an outer diameter surface of the eccentric section 25a, 25b and having an inner track surface on its outer diameter surface; an outer track surface formed directly on an inner diameter surface of the through-hole 30b of the cycloid disc 26a, 26b; a plurality of cylindrical rollers 44 disposed between the inner track surface and the outer track surface; and a retainer (not illustrated) which keeps the distance between the cylindrical rollers 44.

The outer pins 27 are disposed equidistantly on a circular track which centers around the rotational center of the motor-side rotation member 25. As the cycloid discs 26a, 26b make their revolutions, the wavy curves and the outer pins 27 engage with each other and generate rotational movement of the cycloid discs 26a, 26b.

The counterweights 29 are disc-like, have a through-hole at a place away from its center for fitting around the motor-side rotation member 25, and are disposed adjacently to the eccentric sections 25a, 25b respectively, at a 180-degree phase difference therefrom in order to cancel unbalanced inertia couple caused by the rotation of the cycloid discs 26a, 26b.

The motion conversion mechanism is constituted by a plurality of inner pins 31 held by the output shaft 28 and the through-holes 30a formed in the cycloid discs 26a, 26b. The inner pins 31 are disposed equidistantly on a circular track centering around the rotational center of the wheel-side rotation member 28, and has one of its axial end fixed to the wheel-side rotation member 28. Also, in order to reduce frictional resistance with the cycloid discs 26a, 26b, needle roller bearings are provided to make contact with inner wall surfaces of the through-holes 30a of the cycloid discs 26a, 26b.

The through-holes 30a are formed at locations corresponding to the respective inner pins 31. Each of the through-holes 30a has an inner diameter which is larger, by a predetermined difference, than an outer diameter (a "maximum outer diameter including the needle bearing", hereinafter the same will apply) of the inner pins 31.

The speed reducer section lubrication mechanism supplies lubrication oil to the speed reducer section B, and includes a lubrication oil path 25c, a lubrication oil inlets 25d, a lubrication oil exit 25e, a lubrication oil reservoir 25f, a rotary pump 51 and a circulation oil path 25g.

The lubrication oil path 25c extends axially inside the input shaft 25 of the speed reducer section B. The lubrication oil inlets 25d extend from the lubrication oil path 25c toward an outer diameter surface of the input shaft 25. In the present embodiment, the lubrication oil supply inlet 25d is provided in each of the eccentric sections 25a, 25b.

Also, the lubrication oil exit 25e and the lubrication oil path 25c are connected with each other by the circulation oil path 25g inside the housing 22a of the motor section housing 22a. The lubrication oil discharged from the lubrication oil exit 25e flows through the circulation oil path 25g and returns to the lubrication oil path 25c.

In the embodiments described above, a seal member 66 is disposed on an inner-diameter side along the circumferentially arranged fastening bolts for improved sealing between the anchoring flange 33a of the fixing ring 33 and the outboard-side end member 22d to prevent oil leakage from inside.

The seal member 66 can be provided by an O-ring.

Hereinafter, a working principle of the in-wheel motor driving device 21 will be described.

In the motor section A, coils in the stator 23 is supplied with AC current for example, to generate an electromagnetic force, which in turn rotates the rotor 24 which is provided by a permanent magnet or a magnetic member. As the rotor 24 rotates, the input shaft 25 of the speed reducer section B connected thereto rotates, which then causes the cycloid discs 26a, 26b to make their revolution around the rotation center of the input shaft 25. In this process, the outer pins 27 come into engagement with the curvy wave patterns of the cycloid discs 26a, 26b to cause the cycloid discs 26a, 26b to rotate in the opposite direction to the rotating direction of the input shaft 25.

As the cycloid discs 26a, 26b make their rotational movement, the inner pins 31 which are inserted into the through-holes 30a make contact with inner wall surfaces of the through-holes 30a. In this movement, the revolving movements of the cycloid discs 26a, 26b are not transmitted to the inner pins 31 and only the rotational movements of the cycloid discs 26a, 26b are transmitted to the wheel hub bearing section C via the output shaft 28 of the speed reducer section B.

In this process, the speed reducer section B reduces the speed of rotation of the input shaft 25 when the movement is transmitted to the output shaft 28. Therefore, the arrangement allows the use of a low-torque high-rotation motor section A since the arrangement can transmits necessary torque to the driving wheel 14 even from such a type of motor section.

It should be noted here that the speed reducer section B of the configuration described above has a speed reduction ratio which can be calculated as (ZA−ZB)/ZB, where ZA represents the number of the outer pins 27 whereas ZB represents the number of wave patterns in the cycloid discs 26a, 26b. FIG. 9 shows an embodiment with ZA=12 and ZB=11, which gives a very large speed reduction ratio of 1/11.

As understood, an in-wheel motor driving device 21 which is compact and has a high speed-reduction ratio can be achieved by utilizing a speed reducer section B which can provide a large speed reduction ratio without requiring a multi-stage configuration. Also, use of needle bearings in the outer pins 27 and the inner pins 31 reduces frictional resistance of these members with the cycloid discs 26a, 26b. This improves transmission efficiency in the speed reducer section B.

By utilizing the in-wheel motor driving devices 21 according to the above embodiments in the electric vehicle 11, it becomes possible to reduce an unsprung weight. As a result, it becomes possible to obtain an electric vehicle 11 which provides superior driving stability.

In the embodiments described above, the lubrication oil supply inlet 25d is formed at the eccentric sections 25a, 25b. The invention is not limited to this, however, and oil supply inlet may be formed at any place in the input shaft 25. It should be noted, however, that in view of stable supply of the lubrication oil, it is desirable that the lubrication oil supply inlets 25d are located at the eccentric sections 25a, 25b.

Also, in the embodiments described above, the speed reducer section B has two cycloid discs 26a, 26b which have a 180-degree phase difference from each other. However, the number of the cycloid discs may be any. For example, three cycloid discs may be used at a 120-degree phase difference.

Further in the embodiments described above, the motion conversion mechanism is constituted by the inner pins 31 fixed to the output shaft 28 and the through-holes 30a provided at the cycloid discs 26a, 26b. However, the present invention is not limited by this, and a motion conversion mechanism of whatsoever configuration may be employed as far as it can transmit the rotation of the speed reducer section B to the wheel hub 32. For example, the motion conversion mechanism may be constituted by the inner pins fixed to the cycloid discs and holes in the wheel-side rotation member.

It should be noted here that in the embodiments described above, working of components are described with their rotation in focus. Actually, however, a force which includes a torque is transmitted from the motor section A to the driving wheel. Therefore, the driving force provided as a result of speed reduction described above has a high torque.

Also, in the above description of the embodiments, electric power was supplied to the motor section A to drive the motor section A, and the driving force from the motor section A was transmitted to the driving wheel 14. There may be an additional, inverse arrangement for situations where the vehicle is decelerating or running down on a slope, to pick a force from the driving wheel 14 and convert it by the speed reducer section B into a high-speed low-torque rotation and transmit this rotation to the motor section A, so that the motor section A can serve as a power generator. Further, there may be an arrangement to store the power generated in this way in a battery for later use to drive the motor section A for example, or operate other electric components on board.

In the above-described embodiments, the motor section A was provided by a radial gap motor. However, the present invention is not limited to this, and any suitable motor may be employed. For example, an axial gap motor which includes a stator fixed to a housing, and a rotor which is disposed inside the stator and opposed thereto with an axial gap may be utilized.

Also, in each of the embodiments described above, the speed reducer section B in the in-wheel motor driving device 21 is implemented by a cycloid reduction gear system. However, the present invention is not limited to this, and any speed reducing mechanism may be employed. Examples include planetary gear speed reducing mechanism and parallel axis gear speed reducing mechanism.

Further, the electric vehicle 11 shown in FIG. 7 has the rear wheels 14 serving as driving wheels. However, the present invention is not limited to this, and the front wheels 13 may serve as driving wheels or the vehicle may be a four-wheel drive vehicle. It should be noted here that in the present description, the term "electric vehicle" means any type of vehicle which is driven by electricity. For example, therefore, hybrid cars and similar vehicles should also be included in this category.

Thus far, embodiments of the present invention have been described with reference to the drawings. However, the present invention is not limited to these illustrated embodiments. Any of these embodiments illustrated thus far may be modified or changed in many ways within the scope or within the equivalence of the present invention.

REFERENCE SIGNS LIST 21 in-wheel motor driving device
A motor section

B speed reducer section
C wheel hub bearing section
22a housing of motor section A
22b housing of speed reducer section B
22c inboard-side end member
22d outboard-side end member
23 stator
24 rotor
24a output shaft
25 input shaft
25a, 25b eccentric section
26a, 26b cycloid disc
27 outer pin
28 output shaft
28a flange section
28b shaft section
29 counterweight
32 hub ring
32a hollow section
32b wheel mounting flange
32d nut
32e inner ring
32f outer ring
33 fixing ring
33a anchoring flange
61, 62, 63 bolt
64 bolt hole
65, 66 sealing member
71 drum brake
71a brake drum
71b back plate
72 disc brake
72a brake disc
72b calipers
72c mounting member

The invention claimed is:

1. An in-wheel motor driving device comprising a motor section including an output shaft; a wheel hub bearing section; a speed reducer section; and a wheel braking device; the output shaft of the motor section being coaxially connected with the wheel hub bearing section via the speed reducer section;
wherein:
the wheel braking device is a drum brake including a brake drum which is fastened to a hub ring in the wheel hub bearing section; and a back plate which is disposed on a fixing-ring side of the wheel hub bearing section,
the back plate of the drum brake is formed integrally with an outboard-side end member, which is made of an iron or steel material and fastened to an outboard-side end surface of an aluminum alloy housing of the speed reducer section,
the outboard-side end member is formed with bolt holes for bolts to fasten a fixing ring of the wheel hub bearing section, and
the outboard-side end member is fastened to the aluminum alloy housing of the speed reducer section on an outer diameter side of the speed reducer section using the bolts.

2. The in-wheel motor driving device according to claim 1, wherein the fixing ring of the wheel hub bearing section and the outboard-side end member are formed integrally with each other.

3. The in-wheel motor driving device according to claim 1, wherein the outboard-side end member has a knuckle formed integrally therewith, the knuckle being connected only with a lower arm extending from a car body.

4. The in-wheel motor driving device according to claim 1, wherein the outboard-side end member has a knuckle formed integrally therewith, the knuckle being connected with an upper arm and a lower arm extending from a car body.

5. The in-wheel motor driving device according to claim 1, wherein the outboard-side end member has a knuckle formed integrally therewith, an upper side of the knuckle being connected with a buffering device.

6. The in-wheel motor driving device according to claim 1, wherein a sealing member is disposed between the outboard-side end member and the aluminum alloy housing of the speed reducer section for prevention of oil leakage from inside.

7. The in-wheel motor driving device according to claim 6, wherein the sealing member is an O ring.

8. A vehicle comprising the in-wheel motor driving device according to claim 1.

9. An in-wheel motor driving device comprising a motor section including an output shaft; a wheel hub bearing section; a speed reducer section; and a wheel braking device; the output shaft of the motor section being coaxially connected with the wheel hub bearing section via the speed reducer section;
wherein:
the wheel braking device is a disc brake including a brake disc which is fastened to a hub ring in the wheel hub bearing section; and calipers which are disposed on a fixing-ring side of the wheel hub bearing section,
the calipers have a mounting member which is formed integrally with an outboard-side end member, which is made of an iron or steel material and fastened to an outboard-side end surface of an aluminum alloy housing of the speed reducer section,
the outboard-side end member is formed with bolt holes for bolts to fasten a fixing ring of the wheel hub bearing section, and
the outboard-side end member is fastened to the aluminum alloy housing of the speed reducer section on an outer diameter side of the speed reducer section using the bolts.

10. The in-wheel motor driving device according to claim 9, wherein the fixing ring of the wheel hub bearing section and the outboard-side end member are formed integrally with each other.

11. The in-wheel motor driving device according to claim 9, wherein the outboard-side end member has a knuckle formed integrally therewith, the knuckle being connected only with a lower arm extending from a car body.

12. The in-wheel motor driving device according to claim 9, wherein the outboard-side end member has a knuckle formed integrally therewith, the knuckle being connected with an upper arm and a lower arm extending from a car body.

13. The in-wheel motor driving device according to claim 9, wherein the outboard-side end member has a knuckle formed integrally therewith, an upper side of the knuckle being connected with a buffering device.

14. The in-wheel motor driving device according to claim 9, wherein a sealing member is disposed between the outboard-side end member and the aluminum alloy housing of the speed reducer section for prevention of oil leakage from inside.

15. A vehicle comprising the in-wheel motor driving device according to claim 9.

* * * * *